United States Patent [19]  [11] Patent Number: 4,956,667
Gartner  [45] Date of Patent: Sep. 11, 1990

[54] PRIORITY INTERRUPT DURING EDITING MODE

[75] Inventor: Margaret C. Gartner, Rochester, N.Y.

[73] Assignee: Eastman Kodak Company, Rochester, N.Y.

[21] Appl. No.: 371,238

[22] Filed: Jun. 23, 1989

[51] Int. Cl.$^5$ .............................................. G03G 21/00
[52] U.S. Cl. .................................. 355/202; 355/218; 355/314; 364/200; 364/900
[58] Field of Search ............... 355/314, 218, 202, 200, 355/210; 364/200, 900

[56] References Cited

U.S. PATENT DOCUMENTS 4,568,177 2/1986 Sato et al.
4,597,006 6/1986 Orsburn
4,678,316 7/1987 Abuyama
4,740,818 4/1988 Tsilibes et al.

Primary Examiner—A. T. Grimley
Assistant Examiner—Thu Dang
Attorney, Agent, or Firm—Milton S. Sales

[57] ABSTRACT

A document copier, having a copier operation that includes image editing for inputting data of a production run, which data both (1) specifies special features and (2) defines areas of an original document for treatment by the special features. An interrupt mode interrupts the image editing and the image forming so that a job of higher priority can be processed. The special features specifying data and the area defining data of a production run are stored only for areas which are completely defined at the time of interrupt of the copier operation. The higher priority job is limited to a single image frame such that duplex copies and multi-color copies which require more than one image frame to produce are excluded. A job image buffer capable of holding a predetermined amount of data is provided. The interrupt operation is disabled when there is insufficient space in the job image buffer for storing the data for the higher priority job. Data for the higher priority job is erased from the job image buffer after only one copy is produced, whereby multiple copies of said high priority job cannot be produced.

4 Claims, 6 Drawing Sheets

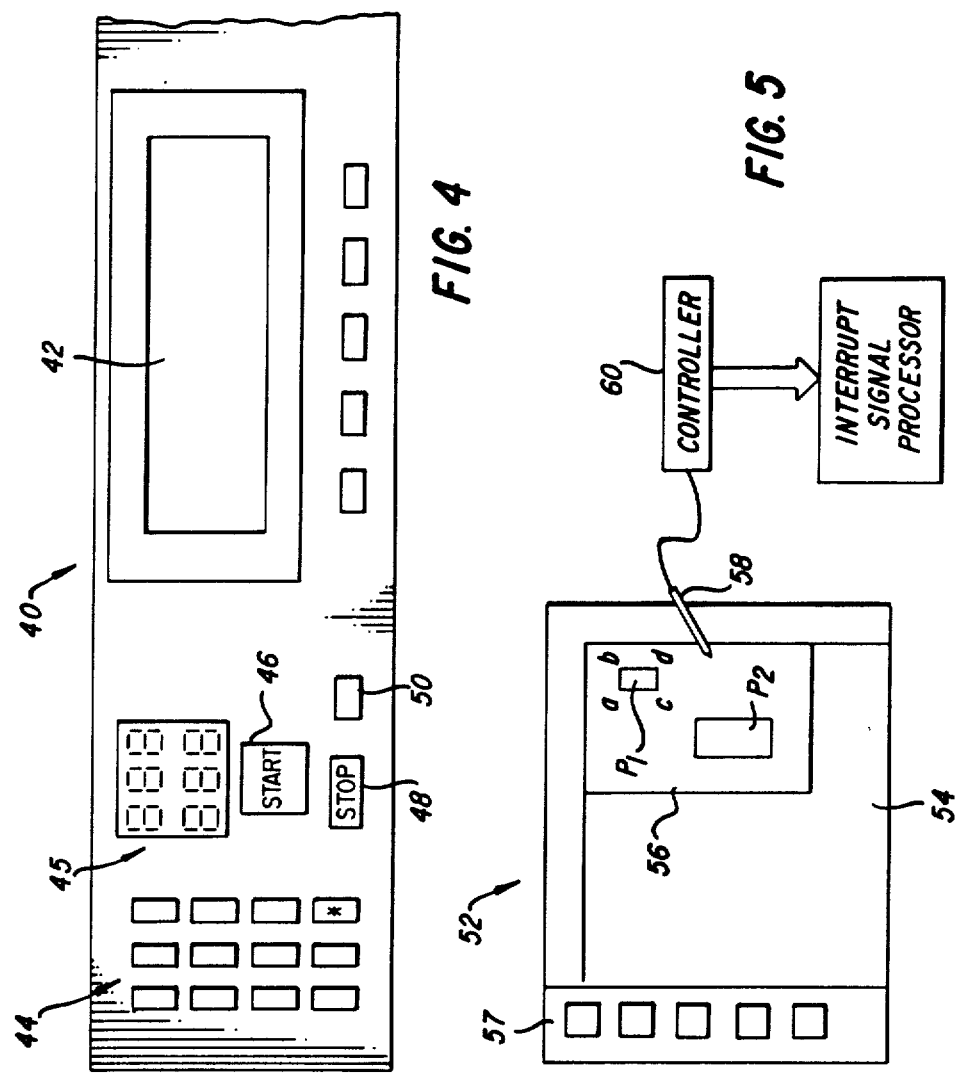

PRIORITY INTERRUPT DURING EDITING MODE

CROSS REFERENCE TO RELATED APPLICATIONS

Reference is made to commonly assigned, co-pending U.S. patent application Ser. No. 137,776 filed in the names of Giannetti et al. on Dec. 24, 1987.

BACKGROUND OF THE INVENTION

1. Technical Field

This invention relates generally to copying apparatus having an editing mode for identifying areas of original documents of a first production run for special treatment, and more specifically to interrupting the editing mode to complete a higher priority job and to thereafter reinstate the status of the apparatus to complete the remainder of the editing mode of the first production run which was interrupted.

2. Background Art

Copiers having image editing modes are well known. In U.S. Pat. No. 4,740,818, electrophotographic reproduction apparatus is described in which an original document to be copied is placed face up on an exposure platen, whereat a wand is used by an operator to identify locations on the original document which define an area for special treatment such as screening, erase, annotation, spot coloration (also called "accent coloring"), relocation in the page format, etc.

Often, it is necessary to interrupt a production run in mid-stream so that a job of higher priority can be processed. If such interruption occurs during the printing mode, there is generally no problem. However, interruption of the editing mode could well result in operator confusion when the interrupted edit mode is reinstated. Once a special treatment is selected, the area of the original document to which that treatment is to be applied is defined by identifying two or more corners thereof. Should a job be interrupted after the first corner is identified but before the last, the operator might forget how far he or she was into the edit.

Accordingly, the present invention specifies various stages during the editing process at which an interrupt may and may not occur.

Copiers are known that include a buffer memory for electronically storing scanned image data and printing instructions for a plurality of pages of a job. Once stored, the pages can be printed as often as desired to produce a plurality of collated sets. If such a copier had a priority interrupt mode operable during scanning, the higher priority job would be loaded into buffer along with the data for the interrupted production run. By the present invention, accommodation is made for the higher priority job data in the such copiers. Preferably, the higher priority job is limited to a single image frame such that duplex copies and multi-color copies which require more than one image frame to produce are excluded. If there is insufficient space in the buffer for storing the data for the higher priority job, the interrupt mode is disabled. Once the higher priority job is produced, its data is erased from buffer.

DISCLOSURE OF INVENTION

According to one feature of the present invention, a document copier having a copier operation that includes image editing and image forming includes image editing means for inputting data of a production run, which data both (1) specifies special features and (2) defines areas of an original document for treatment by the special features. Image forming means, operable in accordance with the image editing means, carries out the special features in the defined areas of a production run. Interrupt mean interrupts the image editing means and the image forming means so that a job of higher priority can be processed. Means, operable upon interruption of copier operation, store the special features specifying data and the area defining data of a production run. The storing means is operable to store the specifying and defining data only for areas which are completely defined at the time of interrupt of the copier operation.

According to another feature of the present invention, a document copier includes a job image buffer capable of holding a predetermined amount of data. Production means are operable (1) for converting images on original documents to electronic bit stream data in image frame format for input to the job image buffer and (2) for reproducing pages from image frames stored in the job image buffer. The production means operation can be interrupted so that a job of higher priority can be processed, wherein the higher priority job may be limited to a single image frame such that duplex copies and multi-color copies which require more than one image frame to produce may be excluded.

According to still another feature of the present invention, the interrupt means is disabled when there is insufficient space in the job image buffer for storing the data for the higher priority job.

According to yet another feature of the present invention, the data for the higher priority job is erased from the job image buffer after only one copy is produced, whereby multiple copies of said higher priority job cannot be produced.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 4 is a view of an operator control panel of the copier of FIGS. 1-3;

FIG. 5 is a schematic view of a digitizer tablet which is part of the copier of FIGS. 1-4, and FIGS. 6A, 6B, and 7 are logic flow charts of the operation of the copier of FIGS. 1-5.

BEST MODE FOR CARRYING OUT THE INVENTION

Because copiers are well known, the present description will be directed in particular to elements forming part of or cooperating more directly with the present invention. Apparatus not specifically shown or described herein are selectable from those known in the prior art.

Figure 1:
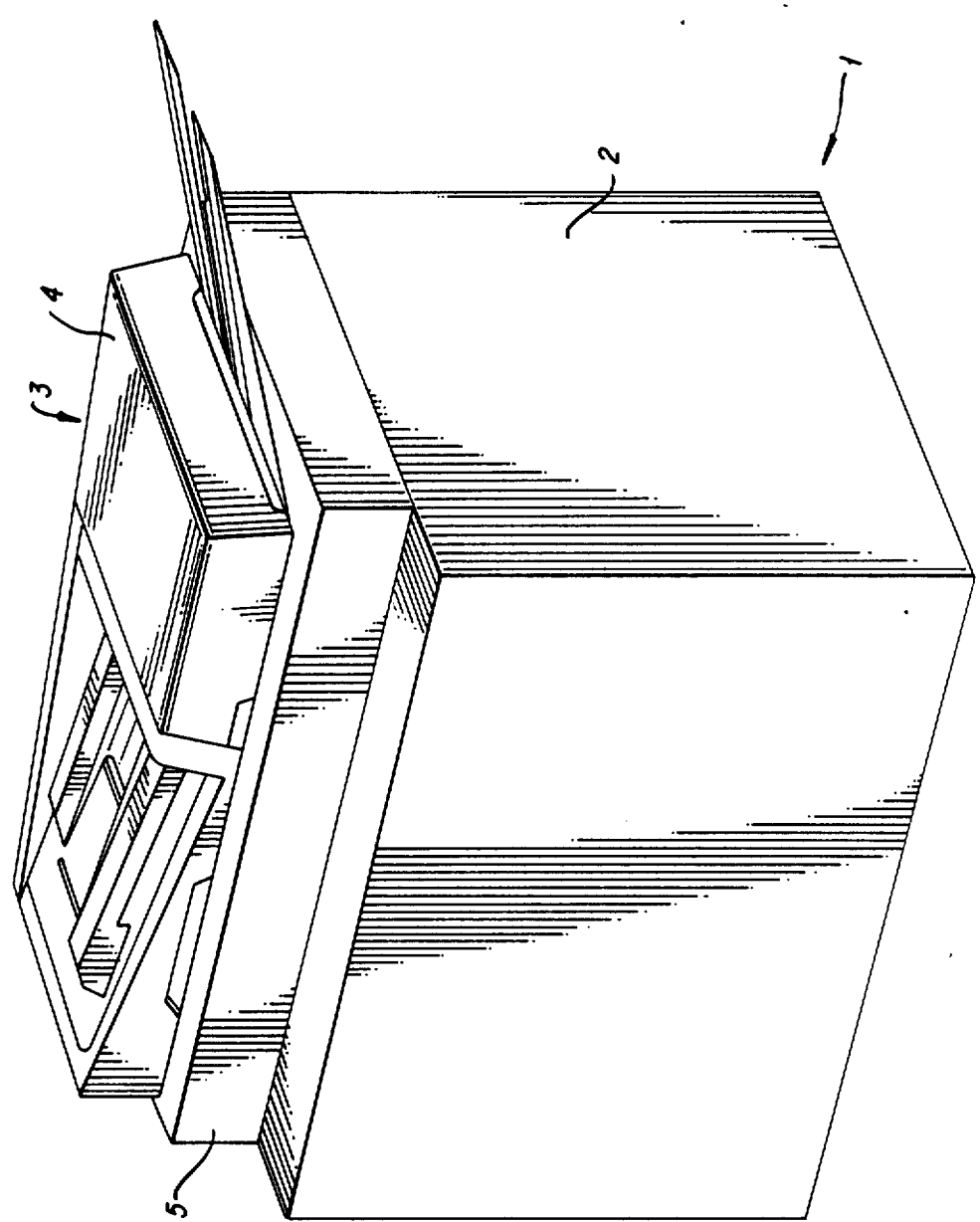
FIG. 1 is a perspective view of one embodiment of an electrophotographic copier for practice of the present invention.

With reference now to FIG. 1, a copier 1 is made up of a marking engine 2 and a scanner 3. The scanner includes a document handler 4 and an optical system enclosed in an optics housing 5. Details of the scanner are disclosed in commonly assigned U.S. patent Application Ser. No. 137,776 filed in the names of Giannetti et al. on Dec. 24, 1987. The disclosure of that application is incorporated herein by reference. A document editor such as a digitizer tablet is incorporated in the scanner, and will be further explained below.

Figure 2:
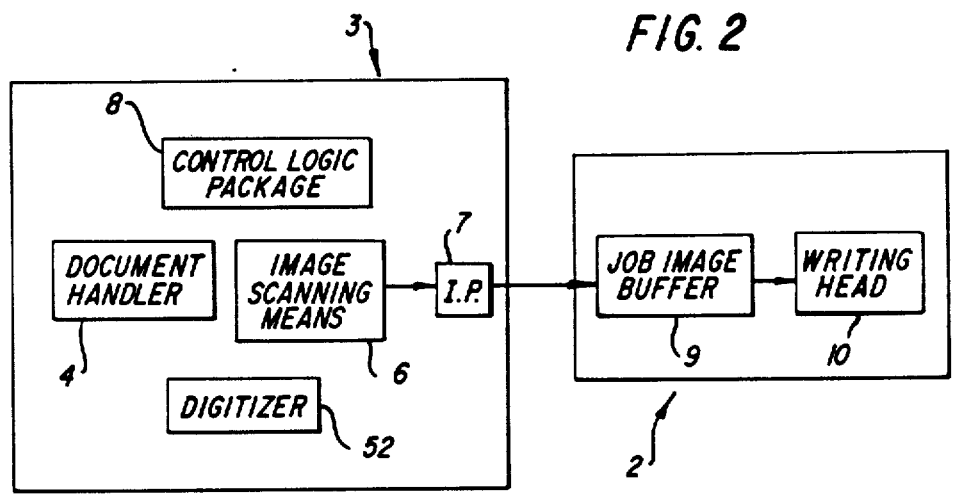
FIG. 2 is a schematic block diagram of the copier of FIG. 1.

Referring to FIG. 2, scanner 3 consists of automatic document handler 4 for stream feeding hardcopy input originals to be automatically read by a solid-state device to such as a linear array of charge-coupled devices. The solid state device scans the input originals, converting their images to electronic bit stream data in page format for input to marking engine 2. This data may be manipulated by image processing electronics 7 having an algorithm to enhance the data to optimize the marking engine electrophotographic process.

Scanner 3 also includes a control logic package 8 having an operator control panel for the operator to input functions and for messages received from the copier. Setup information is input to the scanner and information for finishing and processing of jobs will be sent to marking engine 2. The package consists of control software, interface software, and logic hardware.

Marking engine 2 is the output device that will receive and store bit steam data in its job image buffer 9 and appropriately process that data for copies. The job image buffer stores the bit stream data for each of the pages being copied and delivers these data to a writing head 10 as necessary for sequential copying. The marking engine incorporates the paper handling, photoconductor and process hardware, and writing head 10.

Figure 3:
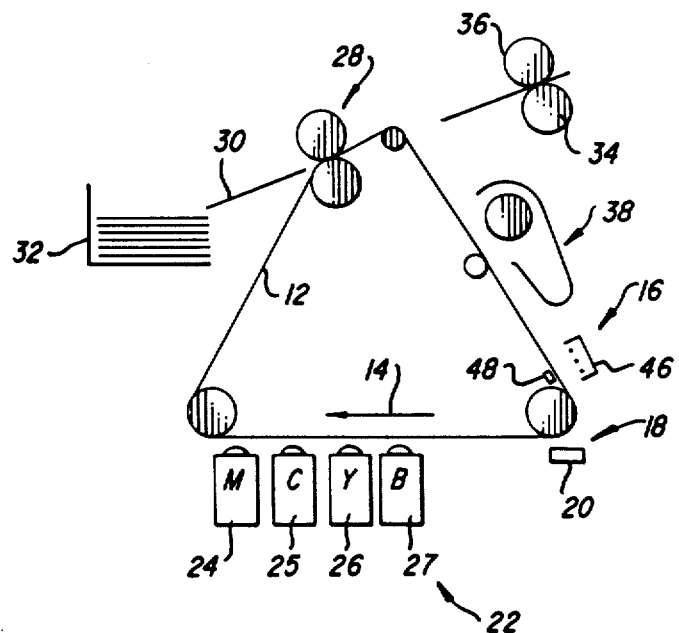
FIG. 3 is a schematic front elevational view of the copier of FIGS. 1 and 2 showing the general arrangement of electrophotographic reproduction apparatus in accordance with one embodiment of the invention.

FIG. 3 schematically illustrates the electrophotographic apparatus of copier 1, including an image transfer member such as photoconductive belt 12. Belt 12 is moved in a clockwise direction, as represented by arrow 14.

A primary charging station 16 applies an electrostatic charge to belt 12. At an exposure station 18, projected light from an exposure station 20 dissipates the electrostatic charge on the photoconductive belt to form a latent electrostatic image corresponding to the image of an original to be copied or printed. Exposure station 20 preferable consists of an array of light emitting diodes such as writing head 10 for exposing the photoconductive belt.

The latent electrostatic image on belt 12 is developed with toner at a developer station 22. The developer station is illustrated as having four separate substations 24, 25, 26 and 27 for processing color images; the substations containing magenta, cyan, yellow, and black toner, respectively. Although four-color capability is illustrated, the present invention is applicable also to monochromatic images also.

As the toner image on belt 12 approaches a transfer station 28, an image receiver sheet 30 is fed from a supply 32. After transfer of the toner image to the receiver sheet, the receiver sheet is passed through a pair of heated fuser rollers 34 and 36. Mechanical and electrical cleaning of belt 12 is effected at a cleaning station 38.

FIG. 4 illustrates an operator control panel 40 which is part of control logic package 8 scanner 3. Panel 40 includes a display 42 upon which messages are shown to indicate to the operator what mode the copier is operating in, what action should be taken next, where malfunctions may be located in the copier, etc. Panel 40 includes soft keys below display 42, a key pad 44, a digital display 45, a "start" button 46, a "reset/stop" button 48, and a "proof" button 50. Job interrupt may be initiated from one of the soft keys below display 42.

FIG. 5 shows a digitizer 52 having an exposure platen 54 which in this example may serve as the support for digitizing an original document 56. A corner of the original document is registered in one corner of the platen to establish a coordinate reference system for inputting information into temporary memory regarding the location of the areas to be operated upon. Digitizers are well known in the art, and the reader is referred to various U.S. patents, including U.S. Pat. Nos. 4,562,485, 4,617,596, 4,674,861, and 4,740,818 as examples of copiers with image editing features.

Through display 42, requests are made that the operator place original document sheet 56 face-up upon exposure platen 54. FIG. 5 shows the upper right corner of the original document sheet registered with a corner reference of the platen. However, one might prefer to adapt the machine so as to register the "staple" corner of the sheet with the appropriate corner reference of the platen. The operator is then requested to select which special treatment is desired; i.e., screening, erase, annotation, spot coloration (also called "accent coloring"), relocation in the page format, etc.

As an example to explain the operation of the editing mode, it is assumed that the original document includes an area $P_1$ which is to be enlarged and relocated in the region $P_2$ of the copy. Once the original document is registered such as with the "staple" corner in a reference corner of the exposure platen, the operator digitizes the "begin" command on a command strip 57 to call up a stored program which requests, through display 42 that the operator indicate by means of a conventional wand 58 the position of areas $P_1$ and $P_2$ relative to the reference corner. The wand may be used to touch the sheet at the four corner points of each area. Preferably the points are touched in an order such that a straight line joins adjacent points as in the order a, b, c, and d to define a rectangle. Alternately, the rectangles can be defined by touching only two diagonally opposed corners. The computer control for the digitizing tablet may also be programmed to accept inputs of area data to define other geometrical shapes such as circles.

Transducers located beneath the sheet produce signals relating the position of the points touched relative to the reference corner of the sheet. Alternatively, the tablet may be of the known sonic type wherein a spark formed by a wand creates sound waves in the air which are sensed by microphones placed along the sides of the exposure platen or wherein a sensor is placed in the wand and sources at known points on the sides of the platen emit sonic signals (see, for example, U.S. Pat. Nos. 4,012,588 in the name of Davis et al. and 4,124,838 in the name of Kiss). A digitizer controller 60 knowing the times of emitting of the signals and their receipt, can through triangulation principles calculate the location of a point on the platen relative to a known point such as the reference corner shown. Controller 60 is programmed to recognize that the area is bordered by the straight lines joining adjacent points a, b, c, and d and the coordinates for areas $P_1$ and $P_2$ can be thus calculated and stored in temporary memory. This information is outputted on display 42 showing the areas.

The document is flipped over on the exposure platen with the document sheet appropriately registered such as with the "staple" corner in another reference corner of the platen. Suitable logic or computing means is provided to translate the area defining points determined during the editing mode to points on an image frame of the photoconductor belt's surface. Job interrupt may be initiated from command strip 57 as well as the soft keys below display 42.

Figure 6A:
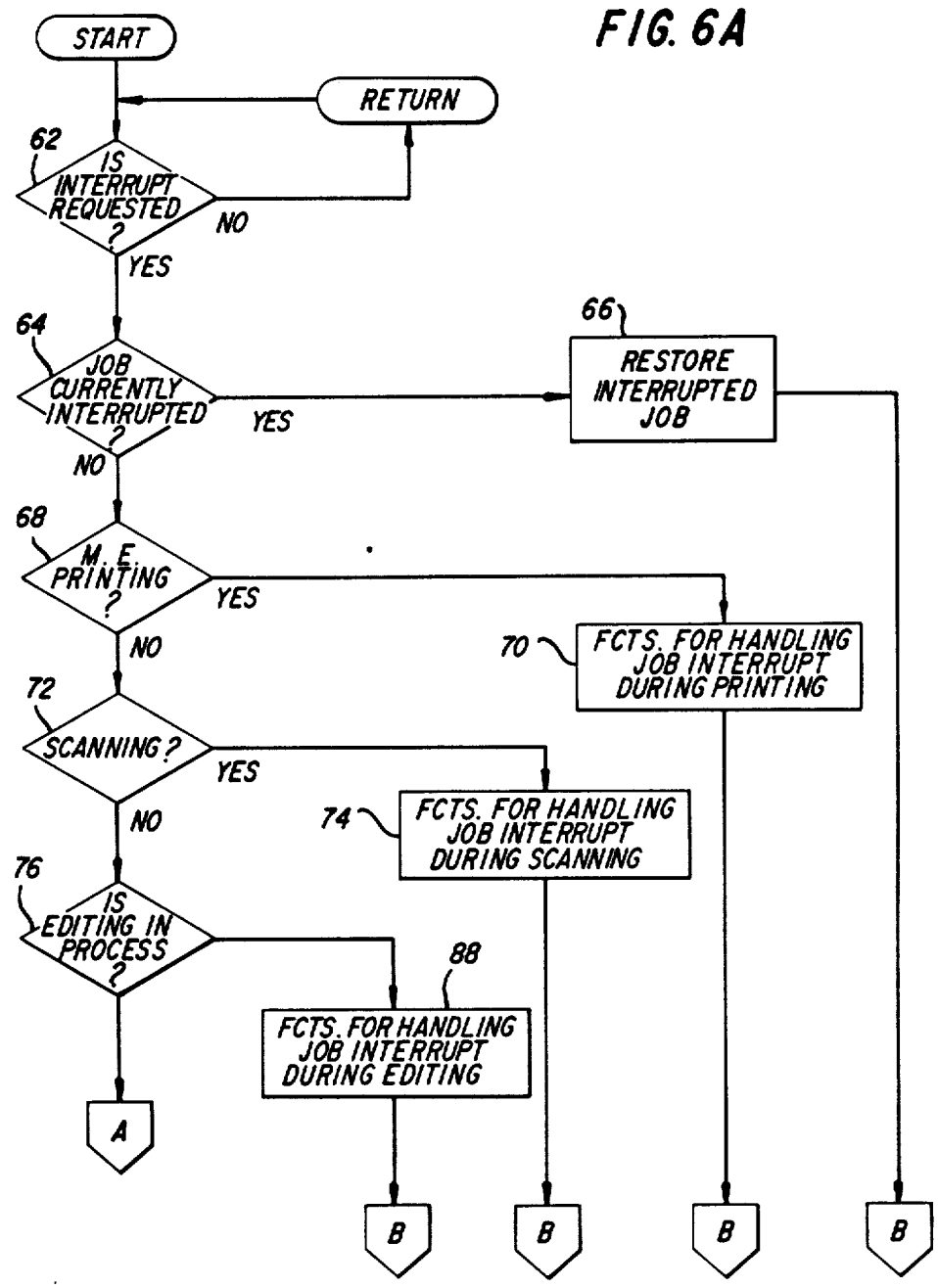

Referring to FIG. 6A, there is shown a flow chart of the interrupt mode operation of the apparatus of FIGS. 1-5. When job interrupt button 50 is pushed, as determined by a decisional block 62, the program determines first if this job is presently in the interrupt mode; decisional block 64. If so, the logic assumes that the operator is indicating that the interrupt is completed, and the copier is returned to the interrupted job, logic block 66.

If on the otherhand, the decision at block 64 was "no" rather than "yes," the logic would progress to a decisional block 68, whereat it would be determined if the marking engine was printing a job. If so, conventional functions for handling an interrupt during printing, including saving selected features of the interrupted job, stopping the production run, and storing in memory the remaining number of copiers of the interrupted job plus other desired pertinent machine status information as described in U.S. Pat. No. 4,099,860, are implemented; logic block 70. Depending on how the copier is set up, the shut down can be effected either at the end of a set, or at the end of the page currently being produced.

When interrupt button 50 is pressed, additional memory space is allocated in buffer 9 for a higher priority job page, and the control panel is set up with the proper defaults for an interrupt job. Preferable, the control panel will be set to simplex mode and monocolor to conserve memory space since duplex and multi-color copies require more than one image frame on photoconductor belt 12. The operator will be advised that the machine is in the interrupt mode, and that the platen rather than the document handler is to be used. Of course, if the entire buffer were full, the interrupt mode would be disallowed.

Returning to decisional block 68, if the marking engine were not in the production mode at the time of interrupt, the logic would exit the block to a decisional block 72; whereat it would be determined if the scanner were in operation. If so, functions for handling a job interrupt during scanning are selected; block 74. Such functions might include the shutdown of the document handler; scanning the original documents that are already in the paper path but not feeding any more.

Figure 6B:
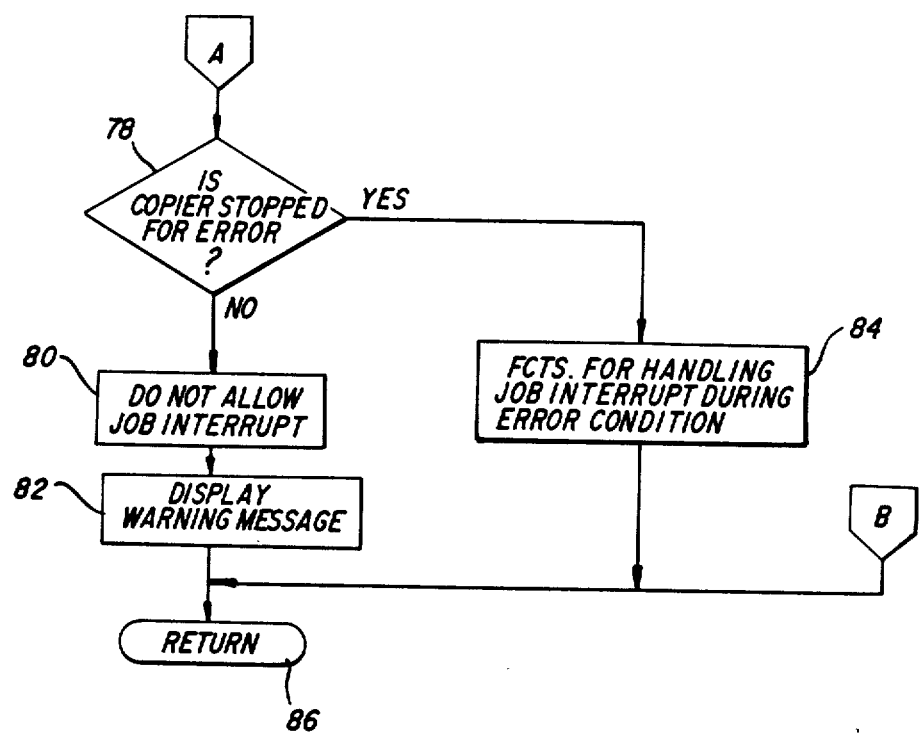

If the scanner is not running, and the interrupt command is received when the apparatus is not in the editing mode as determined at logic decisional block 76, the logic determines at block 78 (FIG. 6B) if the apparatus is stopped because of a malfunction such as a paper jam, out of supplies, etc. If not, there is apparently no job in the machine; so there is nothing to interrupt. Therefore, the mode is not allowed, and the operator is so informed; steps 80 and 82, respectively.

If, on the otherhand, the apparatus has shut down for a malfunction, the interrupt is again disallowed, but different type messages are displayed; such as those needed to correct the malfunction, logic step 84. Once this was done, the interrupt would be permitted. Logic block 86 represents the step of exiting from the interrupt mode.

Figure 7:
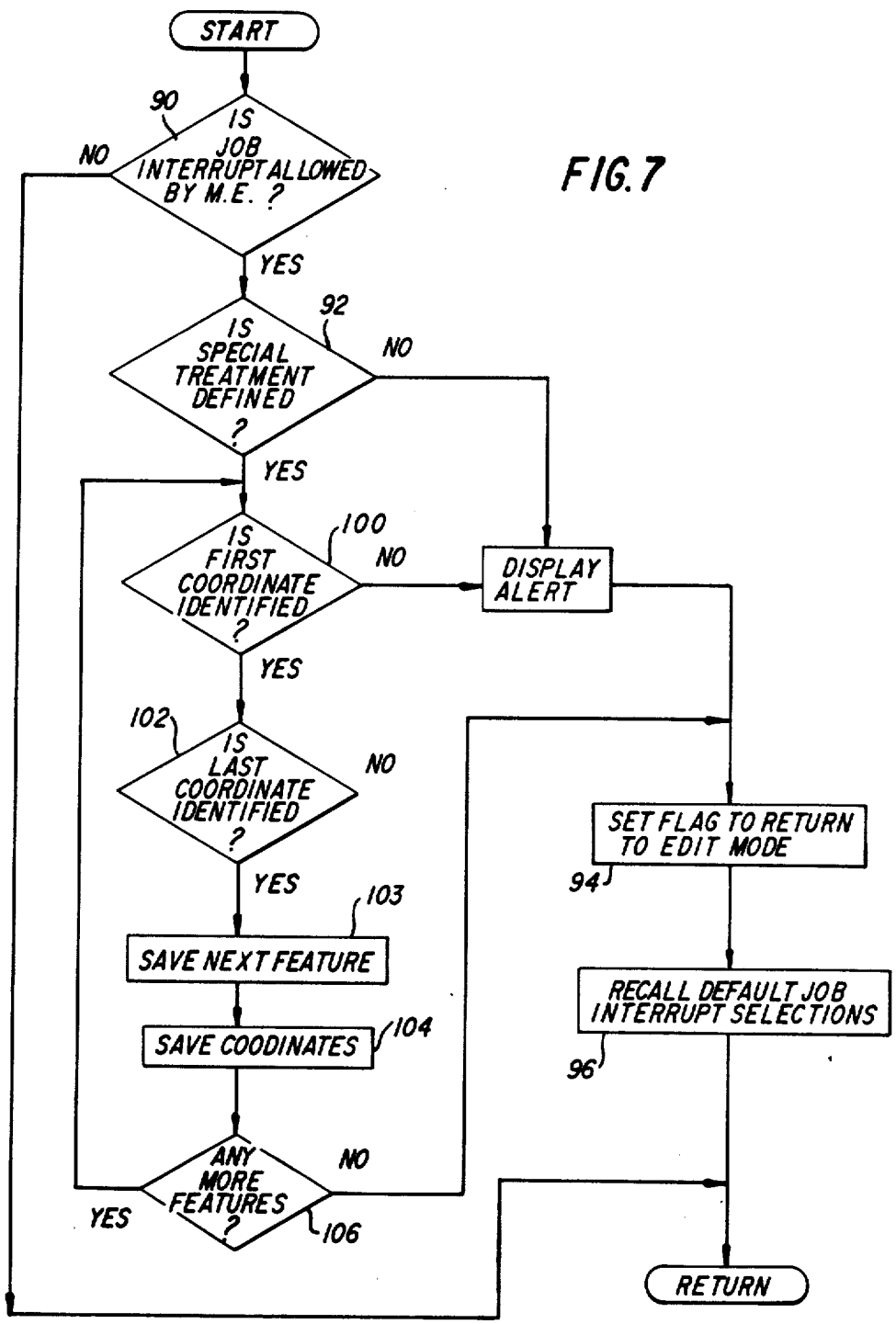

If the decision at block 76 had been "yes" instead of "no," the logic would exit to block 88, containing functions for handling job interrupt during an editing mode. FIG. 7 is a detailed chart of a subroutine effecting those functions.

Initially, the logic is queried whether the marking engine would allow an interrupt; decisional block 90. An example of when interrupt would not be allowed is if the job image buffer were full. In that case, appropriate instructions would be displayed.

If the interrupt mode is allowed (step 90) and no special features have yet been identified (step 92), a flag is set at step 94 so that the edit mode will be re-entered after the interrupt job is completed. Now the copier enters its job interrupt mode, and the selections are set as set forth below; step 96.

If the decision at step 92 had been "yes" rather than "no," and all the corners of the area of the original document for that special feature had not yet been identified, the logic exits either step 100 or 102 and enters step 94 discussed above. If the area has been completely defined, the special feature is saved so as to be available when the interrupt job is complete (step 103 and the coordinate data is also saved, step 104. The process is repeated until all identified special features and areas have been saved, step 106. After the area information is saved, those features associated with the entire job and to the current page being editing are saved in backup memory.

Referring back to step 96 the setup parameters selected for interrupt jobs might preferably include one copy requested, monocolor, normal exposure, 100% reduction, main paper supply, simplex to simplex copying, no covers, no finishing, etc. Generally, all special features will be turned off, including image editing for the interrupt job. It might be desirable to allow the operator to change the paper supply selection, exposure, margin shift, color selection for an entire page, and reduction/enlargement ratios for the interrupt job.

The invention has been described in detail with particular reference to preferred embodiments thereof, but it will be understood that variations and modifications can be effected within the spirit and scope of the invention.

What is claimed is:

1. A document copier having a copier operation that includes image editing and image forming, said copier comprising:

image editing means for inputting data of a production run, which data both (1) specifies special features and (2) defines areas of an original document for treatment by said special features;

image forming means, operable in accordance with said image editing means, for carrying out the special features in the defined areas of a production run;

interrupt means for interrupting the image editing means and the image forming means so that a job of higher priority can be processed;

means, operable upon interruption of copier operation, for storing said special features specifying data and said area defining data of a production run, said storing means being operable to store said specifying and defining data only for areas which are completely defined at the time of interrupt of the copier operation; and means for resuming the copier operation for the interrupted production run after termination of the interruption by said interrupting means.

2. A document copier comprising:
a job image buffer capable of holding a predetermined amount of data;
production means operable (1) for converting images on original documents to electronic bit stream data in image frame format for input to said job image buffer and (2) for reproducing pages from image frames stored in said job image buffer;
interrupt means of interrupting said production means operation so that a job of higher priority can be processed, wherein said higher priority job is limited to a single image frame such that duplex copies and multi-color copies which require more than one image frame to produce are excluded; and
means for resuming operation of said production means operation upon completion of the .higher priority job.

3. A document copier comprising: a job image buffer capable of holding a predetermined amount of data;
production means operable (1) for converting images on original documents to electronic bit stream data in image frame format for input to said job image buffer and (2) for reproducing pages from image frames stored in said job image buffer;
interrupt means of interrupting said production means operation so that a job of higher priority can be processed;
means for disabling said interrupt means when there is insufficient space in said job image buffer for storing the data for said higher priority job; and
means for resuming operation of said production means upon completion of the higher priority job.

4. A document copier comprising:
a job image buffer capable of holding a predetermined amount of data;
production means operable (1) for converting images on original documents to electronic bit stream data in image frame format for input to said job image buffer and (2) for reproducing pages from image frames stored in said job image buffer;
interrupt means of interrupting said production means operation so that a job of higher priority can be processed;
means for storing the data for said higher priority job in said job image buffer;
means for producing said higher priority job from data stored in said job image buffer;
means for erasing the data for said higher priority job from said job image buffer after only one copy is produced, whereby multiple copies of said higher priority job cannot be produced, and
means For resuming operation of said production means upon completion of the higher priority job.

* * * * *